United States Patent [19]
Donohue

[11] 3,923,101
[45] Dec. 2, 1975

[54] PIN CYLINDER LITTER COLLECTOR

[76] Inventor: Paul C. Donohue, 82-13 32nd Ave., Jackson Heights, N.Y. 11370

[22] Filed: Apr. 5, 1974

[21] Appl. No.: 458,281

[52] U.S. Cl. .................................. 171/63; 56/328 R
[51] Int. Cl.² ......................................... A01B 43/00
[58] Field of Search ........ 171/63; 56/328 R; 172/45

[56] References Cited
UNITED STATES PATENTS

| | | | |
|---|---|---|---|
| 1,136,249 | 4/1915 | Lint | 56/328 R |
| 1,565,162 | 12/1925 | King | 56/328 R |
| 1,650,796 | 11/1927 | Kellogg | 56/328 R |
| 1,808,928 | 6/1931 | Lint | 56/328 R |
| 1,859,980 | 5/1932 | Mueller | 56/328 R |
| 2,971,313 | 2/1961 | Smart, Jr. | 56/202 X |
| 3,746,099 | 7/1973 | Black | 56/328 R X |

*Primary Examiner*—Russell R. Kinsey
*Attorney, Agent, or Firm*—Jacob L. Kollin

[57] ABSTRACT

A litter collecting device for picking up litter by wedging or piercing action. The devices comprises a frame, a first shaft rotatable in the frame and rods secured spacedly radially of said first shaft. A cylindrical brush is mounted on a second shaft, mounted in the frame behind the first shaft. Means operably connecting the first and second shaft are provided. The litter is discharged into a container removably attached to the frame.

7 Claims, 4 Drawing Figures

U.S. Patent  Dec. 2, 1975  3,923,101
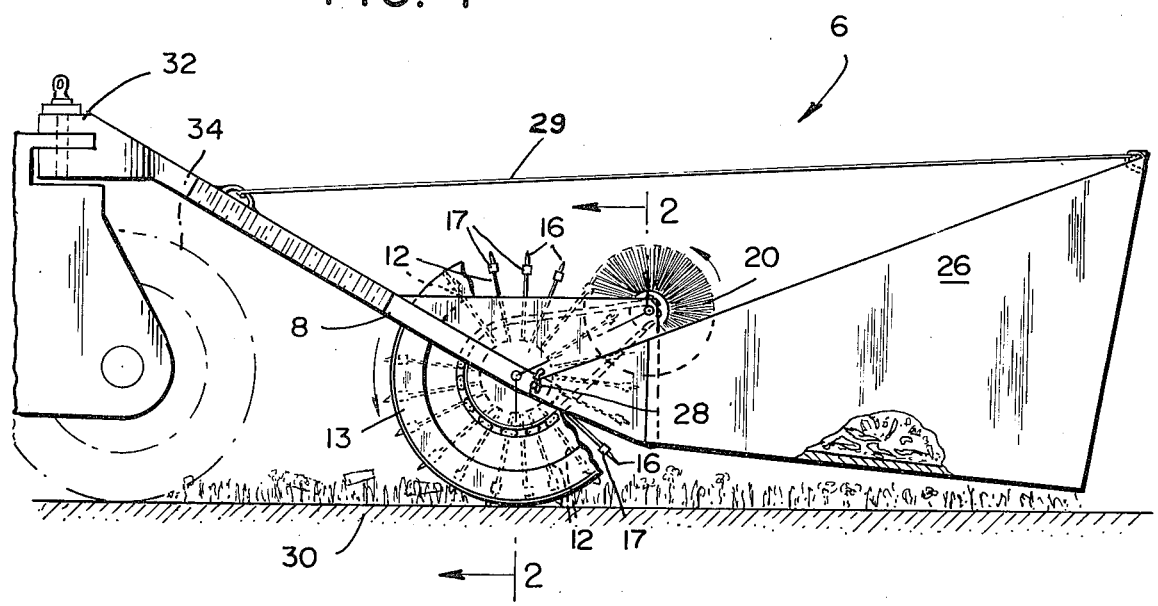
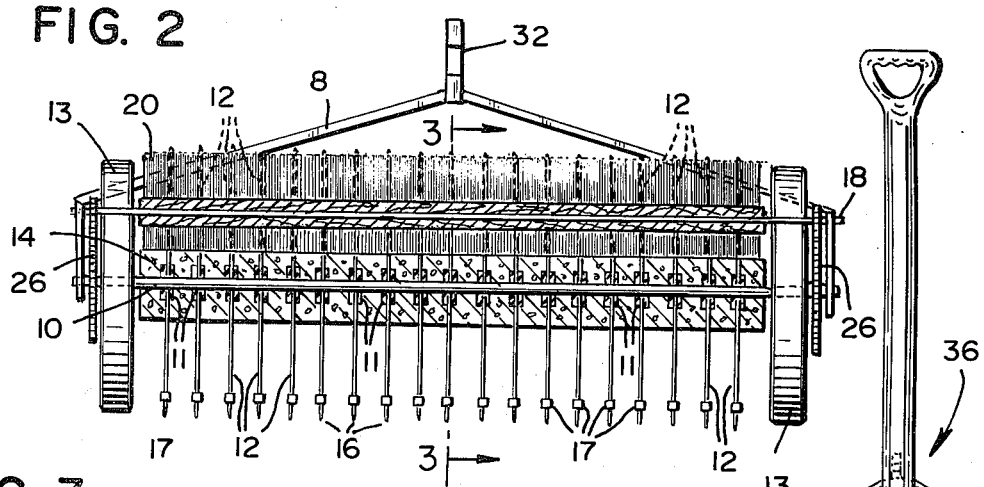
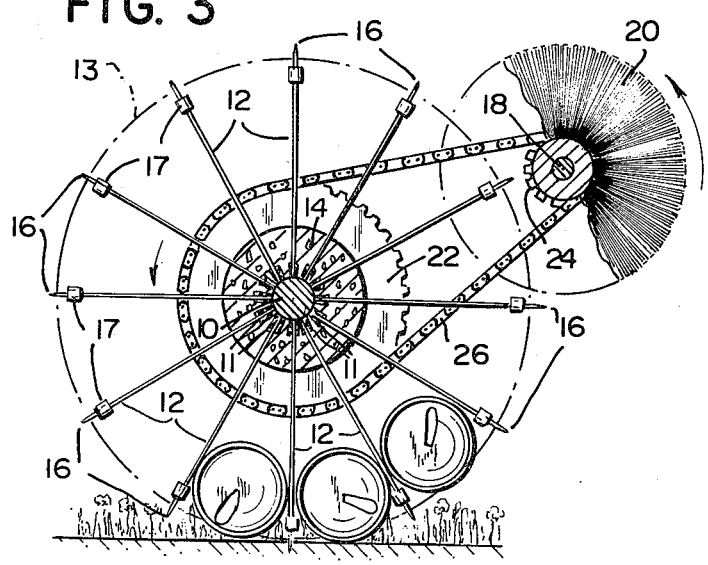
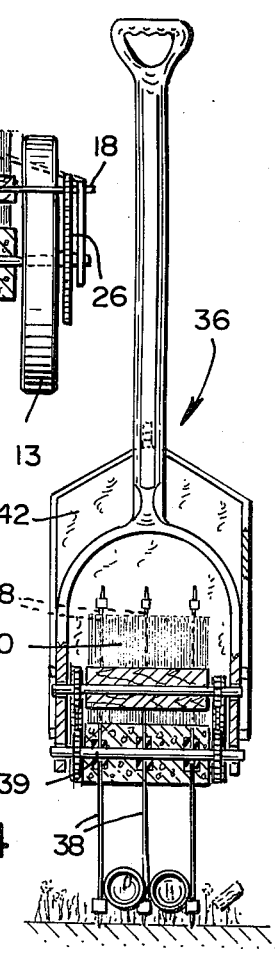

PIN CYLINDER LITTER COLLECTOR

This invention relates to litter collecting devices in general and in particular to such a device which will collect litter objects by a wedging or piercing action.

It is an object of the invention to provide a device of the above character which will be adaptable for efficient operation on various types of terrain, whether clear or obstructed by weeds and high grass, with little interference from the latter.

It is a further object of the invention to provide such a device which is simple in construction and operation and can be manufactured at a reasonable cost.

These and other objects of the invention will become apparent from the following description and the accompanying drawing. It is to be understood, however, that these are given by way of illustration and not of limitation and that changes may be made in the detail construction, form and size of the parts, without affecting the scope of the invention sought to be protected.

In the drawing:

FIG. 1 is a side elevational view of the device with portions broken away and omitted, FIG. 2 is a section taken on line 2—2 of FIG. 1, FIG. 3 is an enlarged section taken on line 3—3 of FIG. 2, and FIG. 4 is another embodiment of the device, for manual operation.

Referring now to the drawing in detail, the litter collecting device, generally indicated as 6 comprises a frame 8, and a first rotatable shaft 10 mounted in the frame. Spaced sleeves 11 of rubber or other resilient plastic materially are mounted on shaft 10 in intimate frictional engagement therewith. Flexible rods 12 are inserted with one of their ends in the sleeves 11 and are secured therein by a cylinder 14 of concrete or other appropriate material which is formed about shaft 10 and the sleeves 11. Wheels 13 are secured to shaft 10.

The free portions of the rods 12 are formed with pointed ends 16 which extend beyond the peripheral path of wheels 13 secured to the ends of shaft 10.

Secured to the flexible rods adjacent their pointed ends 16 are sleeves 17 of rubber or other resilient material.

Rotatably mounted in the frame 8, behind cylinder 14 and slightly higher than the former on a second shaft 18 is a cylindrical brush 20 which is operably engaged with cylinder 14 by means of sprocket 22 on shaft 10, sprocket 24 on shaft 18 and link chain 26.

A bin or receptacle 26 for collected litter, of sheet metal or other appropriate material, is detachably secured, at 28 by known means (not illustrated), to the rear of the frame 8. A cord 29 secures the rear of the bin to the front of the frame, thereby maintaining it above and clear of the ground 30. The front part of the frame is also provided with a coupling 32, by means of which it may be attached to a propulsion vehicle 34.

In use, the flexible rods 12, upon contacting litter objects when the device is in motion, spread and grasp between them these objects which they hold by frictional engagement between sleeves 17. As the litter is rotated it is removed by brush 20 and swept into bin 26, whence it can be removed by detaching container 26.

It will be noted that the rods 12 are also capable of picking up paper, cardboard and similar litter by piercing these with the sharp points 16 and passing them to brush 14, whence they are discharged in a similar manner.

In another embodiment, the manual collector is of similar construction except that wheels for propulsion are dispensed with, movement being effected by spaced rods 38 secured radially of shaft 39 and engaging cylindrical brush 40. whence it is passed to container 42.

I claim:

1. A litter picker comprising, in combination, a frame, a first horizontal shaft mounted in said frame, a pair of ground engaging wheels secured to the ends of said first shaft for causing said first shaft to rotate, means secured about said shaft for attaching a plurality of rods, a plurality of spaces flexible rods attached to said securing means radially of said shaft and having rod ends extending beyond the periphery of said wheels, a second shaft rotatably mounted in said frame rearwardly of said first shaft, a cylindrical brush secured to said second shaft for cooperation with said rods, means operably connecting both said shafts for driving said second shaft upon rotation of said first shaft, a bin for litter secured to said frame rearwardly thereof, said means secured about said first shaft for attaching said rods comprising a plurality of adjacent sleeves of flexible material mounted on said first shaft in frictional engagement with said shaft and a concrete cylinder enclosing said first shaft and said sleeves, said rods extending through said concrete cylinder and said plurality of adjacent sleeves respectively.

2. A litter picker as claimed in claim 1, wherein the free ends of said rods terminate as sharp points for piercing and engaging paper, cardboard and like litter.

3. A litter picker as claimed in claim 2, wherein the free ends of said rods are provided with sleeves of resilient material for frictionally engaging litter therebetween, said sleeves being spaced a distance from said sharp points.

4. The litter picker as claimed in claim 1, wherein said means operably connecting both said shafts comprises a pair of aligned sprocket wheels mounted on said shafts and an endless link chain engageable with said sprocket wheels.

5. The litter picker as claimed in claim 1, wherein said bin has a forward portion detachably mounted on said frame and a cord detachably securing the rear of said bin to said frame, for maintaining said bin clear of the ground.

6. The litter picker as claimed in claim 1, said frame being provided with means for securing said litter picker to a propulsion vehicle for said litter picker.

7. The litter picker as claimed in claim 1, said frame being provided with a handle for manual propulsion.

* * * * *